(12) United States Patent
Hall

(10) Patent No.: US 9,469,802 B2
(45) Date of Patent: Oct. 18, 2016

(54) CHITIN NANOCRYSTAL CONTAINING WELLBORE FLUIDS

(71) Applicant: Halliburton Energy Services, Inc., Houston, TX (US)

(72) Inventor: Lee Jeremy Hall, The Woodlands, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 383 days.

(21) Appl. No.: 13/780,606

(22) Filed: Feb. 28, 2013

(65) Prior Publication Data

US 2014/0238677 A1    Aug. 28, 2014

(51) Int. Cl.

| C09K 8/467 | (2006.01) |
|---|---|
| C09K 8/035 | (2006.01) |
| C09K 8/42 | (2006.01) |
| C09K 8/54 | (2006.01) |
| E21B 33/13 | (2006.01) |
| C04B 28/02 | (2006.01) |
| C04B 28/14 | (2006.01) |
| C04B 103/00 | (2006.01) |

(52) U.S. Cl.
CPC ............... *C09K 8/035* (2013.01); *C04B 28/02* (2013.01); *C04B 28/14* (2013.01); *C09K 8/42* (2013.01); *C09K 8/467* (2013.01); *C09K 8/54* (2013.01); *E21B 33/13* (2013.01); *C04B 2103/0028* (2013.01); *C09K 2208/10* (2013.01); *Y02W 30/94* (2015.05)

(58) Field of Classification Search
CPC ...... C09K 8/467; C09K 2219/00; C04B 7/02
USPC ......................................................... 166/292
See application file for complete search history.

(56) References Cited

U.S. PATENT DOCUMENTS

| 2,670,329 | A | 2/1954 | Jones |
|---|---|---|---|
| 4,387,041 | A | 6/1983 | Hort et al. |
| 4,862,975 | A | 9/1989 | Maillet et al. |
| 5,427,999 | A | 6/1995 | Clewlow et al. |
| 6,258,755 | B1 | 7/2001 | House et al. |
| 6,291,404 | B2 | 9/2001 | House |

(Continued)

FOREIGN PATENT DOCUMENTS

| WO | WO2005073504 A1 | 8/2005 |
|---|---|---|
| WO | WO2007113481 A1 | 10/2007 |

OTHER PUBLICATIONS

Morganti, P. et al., Transforming nanostructured chitin from crustacean waste into beneficial health products: a must for our society, Nanotechnology, Science and Applications 2011:4 123-129.

(Continued)

*Primary Examiner* — Doug Hutton, Jr.
*Assistant Examiner* — Ashish Varma
(74) *Attorney, Agent, or Firm* — McAfee & Taft A Professional Corporation

(57) ABSTRACT

The current invention relates to the use of chitin nanocrystals and chitin nanocrystal derivatives. More specifically, the present invention relates to the use of chitin nanocrystals and chitin nanocrystals used in oil and gas operations. The chitin nanocrystals and chitin nanocrystals derivatives can be used as additives to cement and wellbore fluids and can be used to inhibit corrosion in pipelines, on downhole tools and on other oil and gas related equipment.

24 Claims, 7 Drawing Sheets

(56) References Cited

U.S. PATENT DOCUMENTS

| | | | |
|---|---|---|---|
| 6,586,372 B1 | 7/2003 | Bradbury et al. | |
| 6,846,420 B2 | 1/2005 | Reddy et al. | |
| 6,967,027 B1* | 11/2005 | Heux et al. | 424/488 |
| 6,992,048 B2 | 1/2006 | Reddy et al. | |
| 7,036,586 B2 | 5/2006 | Roddy et al. | |
| 7,156,174 B2* | 1/2007 | Roddy et al. | 166/293 |
| 7,192,527 B2 | 3/2007 | Reddy | |
| 7,204,312 B2 | 4/2007 | Roddy et al. | |
| 7,229,952 B2 | 6/2007 | Reddy et al. | |
| 7,240,732 B2* | 7/2007 | Lewis et al. | 166/292 |
| 7,374,690 B2 | 5/2008 | Reddy | |
| 7,497,258 B2 | 3/2009 | Savery et al. | |
| 7,806,183 B2 | 10/2010 | Roddy et al. | |
| 7,892,352 B2 | 2/2011 | Roddy et al. | |
| 7,902,128 B2 | 3/2011 | Zhang et al. | |
| 2003/0141062 A1 | 7/2003 | Cowan et al. | |
| 2005/0006094 A1* | 1/2005 | Sorenson, Jr. | 166/281 |
| 2009/0203642 A1 | 8/2009 | Morganti et al. | |
| 2010/0075874 A1 | 3/2010 | Perera Mercado et al. | |
| 2010/0256023 A1 | 10/2010 | Pauls et al. | |
| 2012/0114523 A1 | 5/2012 | Hellberg et al. | |
| 2012/0238479 A1 | 9/2012 | Choudhary et al. | |
| 2012/0285683 A1 | 11/2012 | Hermes | |

OTHER PUBLICATIONS

Ifuku, Shinsuke et al., Preparation of Chitin Nanofibers with a Uniform Width as α-Chitin from Crab Shells, Biomacromolecuies 2009, 10 1584-1588.

Muzzarelli, Riccardo et al., Chitin Nanofibrils, Chitin and Chitosan: Research Opportunities and Challenges, New Age International, New Deli, India, May 2, 2005.

Kumar, Majeti N.V. Ravi, A review of chitin and chitosan applications, Reactive & Functional Polymers 46 (2000) 1-27.

Vincent, Julian F,V., Arthropod cuticle: a natural composite shell system, Composites: Part A 33 (2002) 1311-1315.

International Search Report and Written Opinion issued Jul. 21, 2014 in corresponding international application PCT/US14/016084, Halliburton Energy Services, Inc.

* cited by examiner

CHITIN NANOCRYSTAL CONTAINING WELLBORE FLUIDS

BACKGROUND OF THE INVENTION

1. Field of the Invention

The current invention relates to the use of chitin nanocrystals and chitin nanocrystal derivatives. More specifically, the present invention relates to the use of chitin nanocrystals and chitin nanocrystals use in oil and gas operations.

2. Description of Related Art

Chitin is a natural biopolymer material found in the protective exoskeletons of arthropods (insects, spiders, crustaceans such as crab, shrimp, etc.). Exoskeletons represent a natural composite material having a hierarchical structure containing proteins and minerals along with chitin. This chitin provides reinforcement of the protein matrix in the arthropods' shells, analogous in function to glass or carbon fibers in man-made fiber-reinforced composites. Use of chitin and its derivative chitosan has been proposed for use in certain drilling applications, such as an additive to drilling fluids. However, such applications have either utilized small particles of the shells complete with their native protein matrix or have utilized extracted chitin or chitosan polymer molecules without regard to the nanofiber physical composition or arrangement. Accordingly, such methods have not made the most beneficial use of the chitin or chitosan.

SUMMARY OF THE INVENTION

In accordance with the invention, it has been found that the chitin nanocrystals and chitin nanocrystal derivatives can be useful in a variety of embodiments related to the field of oil and gas production. Such chitin nanocrystals and chitin nanocrystal derivatives can be useful as rheology modifiers, shale stabilizers or flocculants, fluid loss additives, corrosion inhibitors, emulsion stabilizers, gel scaffolds and as reinforcement additives for cement as exemplified by the following embodiments.

In accordance with one embodiment of the invention there is provided a method for treating a wellbore comprising circulating a wellbore fluid in the wellbore. The wellbore fluid comprises a fluid and at least one additive selected from the group consisting of chitin nanocrystals, chitin nanocrystal derivatives and combinations thereof.

In accordance with another embodiment of the invention there is provided a cement composition comprising a hydraulic cement and at least one additive selected from the group consisting of chitin nanocrystals, chitin nanocrystal derivatives and combinations thereof.

In accordance with yet another embodiment of the invention there is provided a method of cementing comprising introducing a cement composition into a subterranean formation. The cement composition comprises a hydraulic cement and at least one additive selected from the group consisting of chitin nanocrystals, chitin nanocrystal derivatives and combinations thereof.

In accordance with still another embodiment of the invention there is provided a composition for inhibiting production from a subterranean formation comprising a gel scaffold produced from a gel scaffold agent selected from the group consisting of chitin nanocrystals, chitin nanocrystal derivatives and combination thereof.

In accordance with an additional embodiment of the invention there is provided a method of inhibiting production from a subterranean formation comprising: circulating a drilling fluid and a gel scaffold agent through a wellbore penetrating the subterranean formation wherein the gel scaffold agent is selected from the group consisting of chitin nanocrystals, chitin nanocrystal derivatives and combinations thereof; and treating the gel scaffold agent so that it forms a gel scaffold at the subterranean formation.

In yet another embodiment of the invention there is provided a method of inhibiting corrosion of a metal surface comprising contacting the metal surface with a corrosion inhibiting amount of an inhibitor selected from the group consisting of chitin nanocrystals, chitin nanocrystal derivatives and combinations thereof.

DESCRIPTION OF THE PREFERRED EMBODIMENTS

Figure 1:
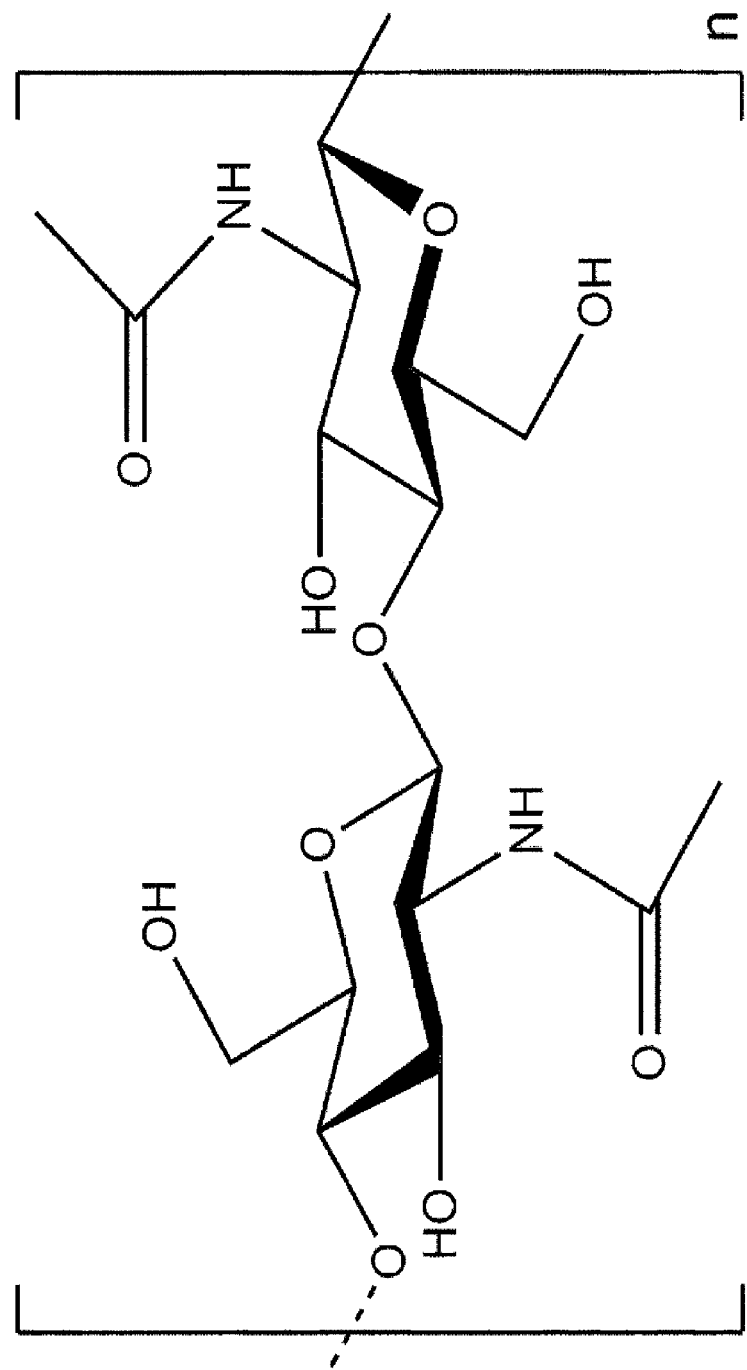
FIG. 1 is a structural formula for chitin.

In general, chitin and chitin fibers or chitin microfibers refers to chitin material that is obtained from a mixture of crystalline and amorphous components, which can contain residual chitosan, mineral or protein fragments that was part of the exoskeleton material from which the chitin was obtained. This chitin and chitin fiber, even if free from the amorphous component, is chaotic in its over all structural arrangement; that is it contains a variety of chitin structures including a large proportion of chitin microfibrils having a diameter of 2 to 5 nm, as well as bundled chitin microcrystals having a diameter of from 5 nm to about 50 nm and even more densely bundled chitin microcrystals having a diameter of from 50 to 200 nm. More recently, methods of more effectively eliminating the amorphous material and of producing a more consistent structural arrangement has been achieved. These methods have achieved a more consistent or regular chitin product of chitin nanocrystals or nanofibers.

The chitin and chitin derivatives utilized in the invention are chitin nanocrystals and chitin nanocrystal derivatives. As used herein chitin nanocrystals (called elsewhere chitin nanowhiskers or chitin nanofibril) refers to chitin free of bulk amorphous material and primarily comprised of chitin molecules stacked or bundled into three dimensional arrangements having diameter of 5 nm to 50 nm, preferably from 10 nm to 20 nm, and a length from 100 nm to 1000 nm and more typically from 200 nm to 300 nm in length. By "primarily comprised of" it is meant that the average size of the chitin nanocrystals for the entire chitin compound falls within the aforementioned diameter and length ranges and preferably over 50% of the chitin compound is composed of nanocrystals falling within the aforementioned ranges. More preferably over 75% or over 90% of the chitin compound is composed of nanocrystals falling within the aforementioned ranges. These chitin nanocrystals can have a Young's Modulus exceeding 130 GPa with a tensile strength of about 7.5 GPa. Such crystal bundles have a core of chitin molecules, which has little and generally no surface exposure and surface chitin molecules that are exposed to the surrounding environment.

Generally, such chitin nanocrystals can be isolated by a process having two primary parts. First, raw chitin is treated to remove the amorphous portions or non-chitin portion. This first part can involve acid hydrolysis and can involve bleaching and neutralizing the acid. The second part is to separate the resulting nanocrystals from their aqueous suspension, which can be by filtration, dialysis, centrifugation or spray drying. Processes for isolating chitin nanocrystals have been disclosed in Ifuku, et al., *Preparation of Chitin Nanofibers with a Uniform Width as α-Chitin from Crab Shells*, Biomacromolecules 2009, 10, 1584-1588; and Muzzarellii, et al., (2005) *Chitin nanofibrils*, In: Duta P K (ed) *Chitin and Chitosan: Research Opportunities and Challenges*, New Age, New Delhi, India.

Chitin nanocrystal derivatives refer to chemical derivatives of chitin nanocrystals by modifying or substituting one or more functional groups on the chitin nanocrystals. As described above, the chitin nanocrystals are three-dimensional crystals of ordered chitin polymer chains. The chitin nanocrystals have core chitin polymer chains and surface chitin polymer chains. In preparing derivatives of the chitin nanocrystals, generally the surface chitin molecules will have functional groups modified or substituted and the core chitin molecules will have no functional groups replaced or substituted. Thus, the chitin nanocrystal derivatives referred to herein are ones where the surface functional groups are modified or substituted and the core functional groups are substantially unmodified or unsubstituted.

As can be seen from FIG. 1, the functional groups of the chitin molecules are the hydroxyl and amide groups attached to the pyranose rings in the backbone of the polymer chain. Generally, while there are hydroxyl groups at the 3 position and 5 position of the glucose ring, it is the hydroxyl group at the 5 position that will be the most active and subject to substitution because it is a primary alcohol. Accordingly, as used herein hydroxyl functional groups will generally refer to the hydroxyl groups at the 5 position and amide functional group will generally refer to the amide functional group at the 2 position.

In accordance with the above, the term "chitin nanocrystal derivative," as used herein, means a derivative of a chitin nanocrystal with at least some of the surface hydroxyl functional groups and/or some of the surface amide functional groups substituted.

The chitin nanocrystal derivatives useful in the current invention include the following: chitosan nanocrystals, oxidized chitin nanocrystal derivatives, hydrocarbon chitin nanocrystal derivatives and cross-linked chitin nanocrystal derivatives. The chitin nanocrystal derivatives have modified or substituted surface functional groups and substantially no modification or substitution of the core functional groups. In other words, the core chitin polymer chains of the nanocrystal have no or an insubstantial percentage of their functional groups modified or substituted from the hydroxyl or amide functional group of chitin. By "insubstantial" it is meant that if there is any substitution or modification of the core functional groups it is not enough to affect the chemical or physical properties of the chitin nanocrystal derivative. Generally, if there is any modification or substitution of the core functional groups, it is often less than 2% such of groups and typically less than 1%.

Figures 2, 3:
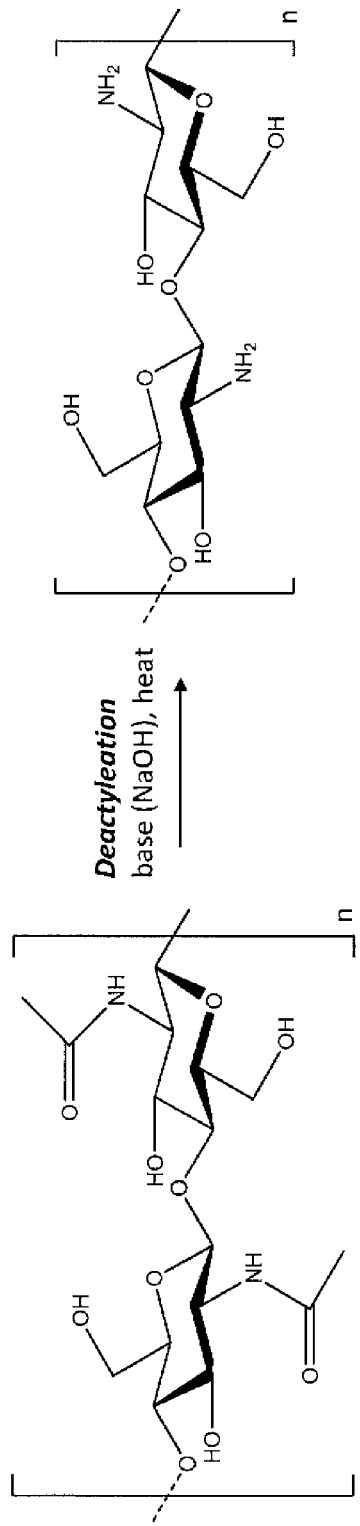
FIG. 2 shows the deacetylation of chitin to chitosan.
FIG. 3 shows the oxidation of chitin to a chitin derivative having carboxyl functional groups substituted for hydroxyl functional groups.

"Chitosan nanocrystals" as used herein refers to a chitin nanocrystal derivative with at least a portion of the surface amide functional groups substituted with amine functional groups by deacetylation. Such chitosan nanocrystals can have 60% or more deacetylation; that is, 60% or more of the surface amide functional groups replaced with amine functional groups. More specifically, such chitosan nanocrystals can have 60% to 100% deacetylation, can have 70% to 100% deacetylation and can have 85% to 100% deacetylation. The derivation of a chitosan nanocrystal is illustrated in FIG. 2.

Figure 4:
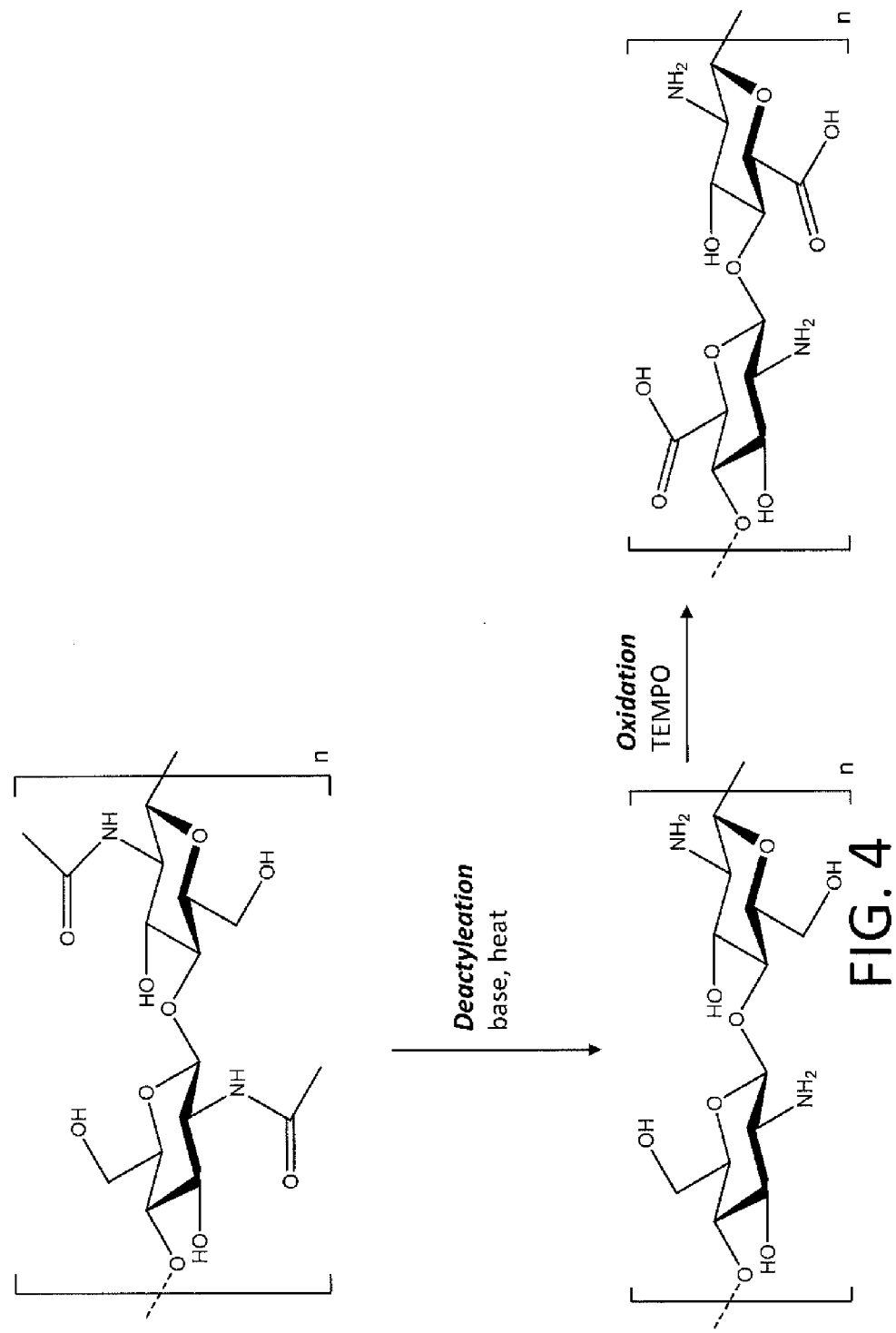
FIG. 4 shows the derivation of a chitin derivative in which carboxyl functional groups have been substituted for hydroxyl functional groups and in which amine functional groups have been substituted for amide functional groups.

Oxidized chitin nanocrystal derivatives as used herein refers to chitin nanocrystal derivatives that have at least a portion of their surface hydroxyl functional groups substituted with a carboxyl functional group. Such oxidized chitin nanocrystals can have 60% or more of the surface hydroxyl functional groups replaced with carboxyl functional groups. More specifically, such oxidized chitin nanocrystals can have 60% to 100% surface functional group substitution, can have 70% to 100% surface functional group substitution and can have 85% to 100% surface functional group substitution. The derivation of oxidized chitin nanocrystal derivatives are illustrated by FIGS. 3 and 4.

Hydrocarbon chitin nanocrystal derivatives as used herein refers to chitin nanocrystal derivatives that have surface amide substituted groups which include alkanes, alkenes, alkynes, ethers, esters and/or cyclic hydrocarbons of from 2 to 16 carbon atoms. Such hydrocarbon chitin nanocrystals can have 60% or more of the surface amide functional groups replaced with hydrocarbon functional groups. More specifically, such hydrocarbon chitin nanocrystals can have 60% to 100% surface functional group substitution, can have 70% to 100% surface functional group substitution and can have 85% to 100% surface functional group substitution. Larger functional groups, which can be hydrocarbons with 6 or more atoms and includes hydrocarbons with more than 10 atoms, will not substitute on the core chitin polymer chains without disrupting or breaking the nanocrystal structure. Accordingly, for such larger functional groups there will be no substitution on the core chitin polymer chains for chitin nanocrystal derivatives in accordance with the invention.

Figure 5:
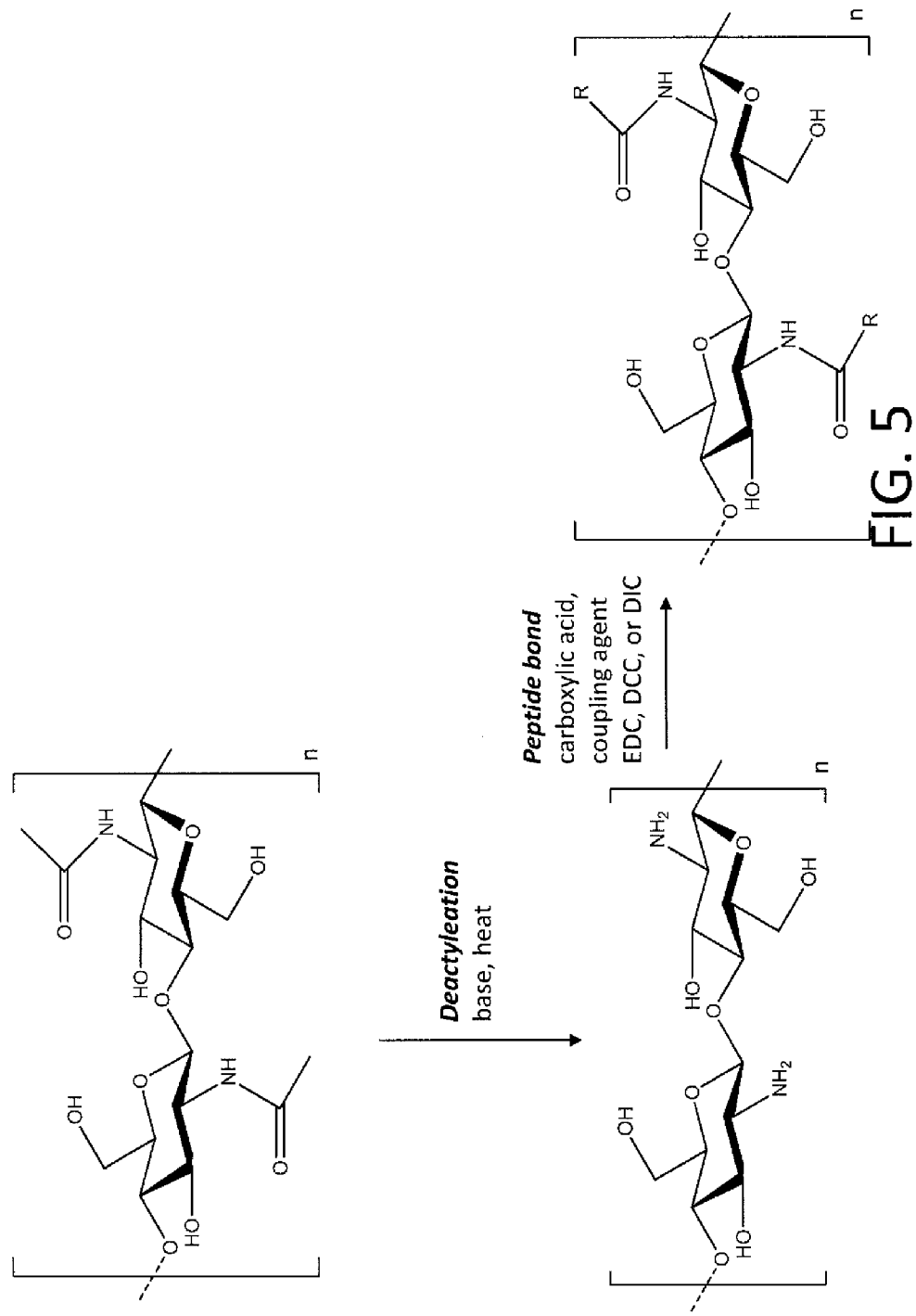
FIG. 5 shows the derivation of a chitin derivative, which can be cross-linked at the R side chain.
Figure 6:
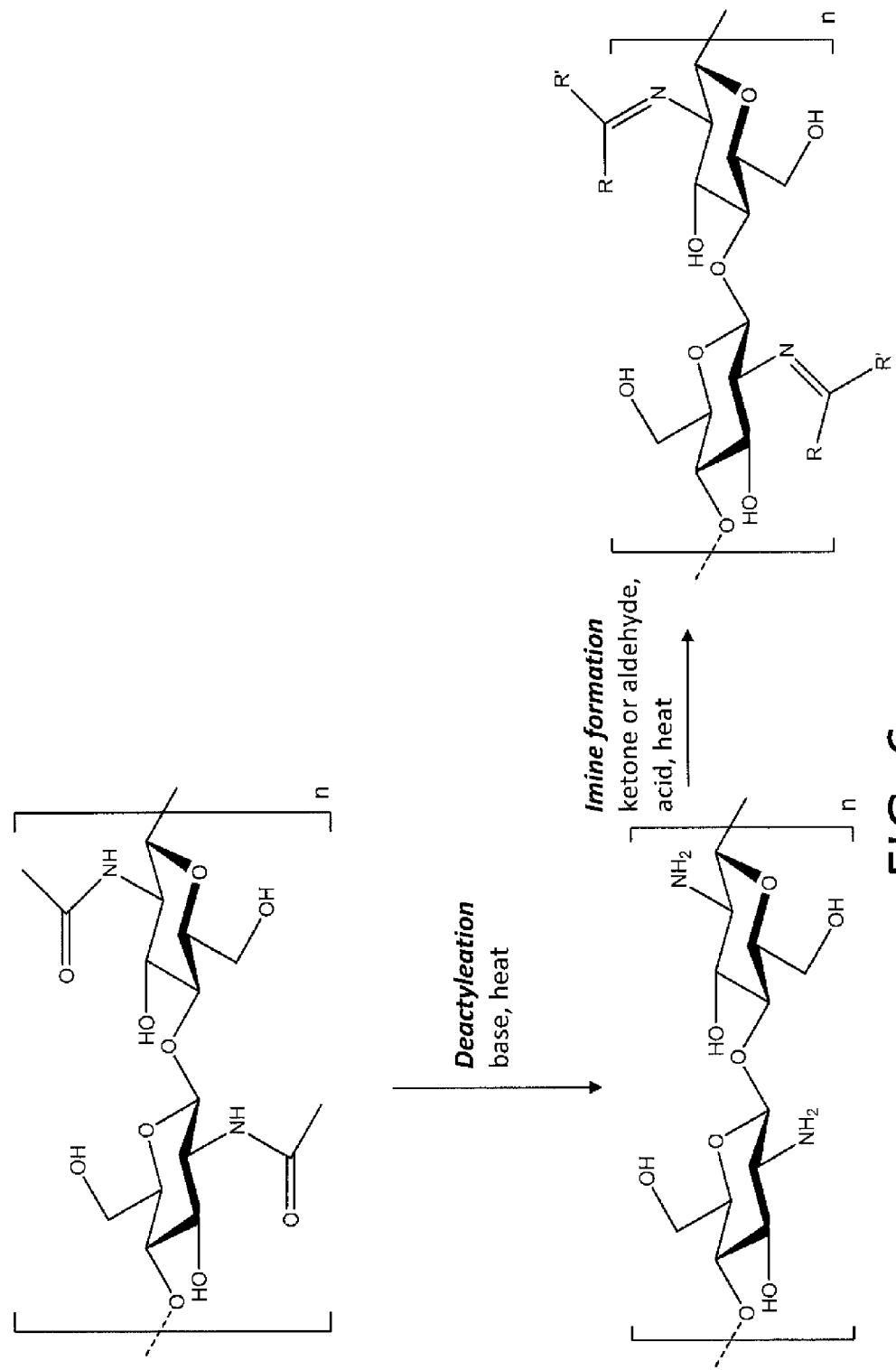
FIG. 6 shows the derivation of a chitin derivative having imine functional groups.
Figure 7:
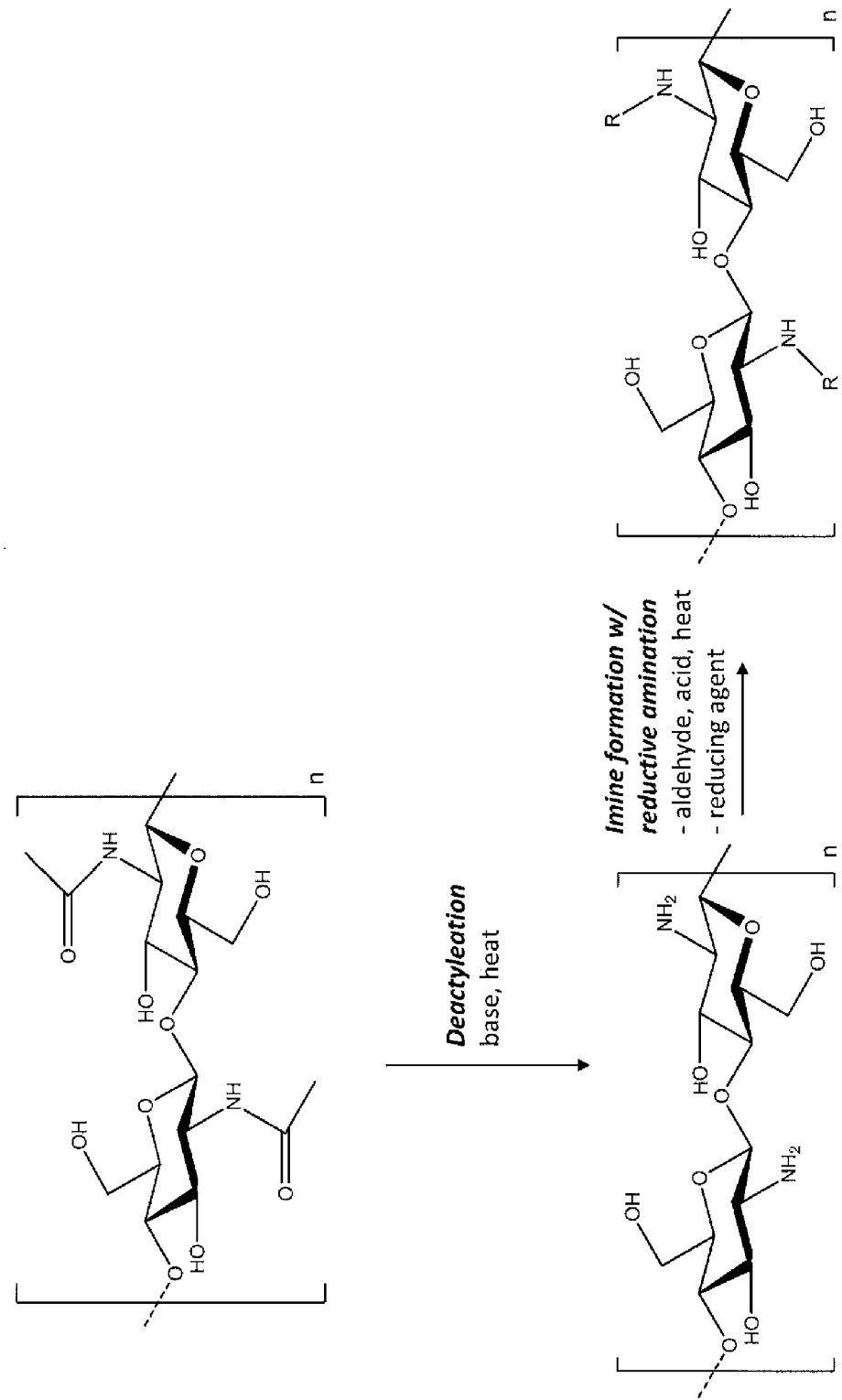
FIG. 7 shows the derivation of a chitin derivative having a side chain R on an amine functional group.
Figure 8:
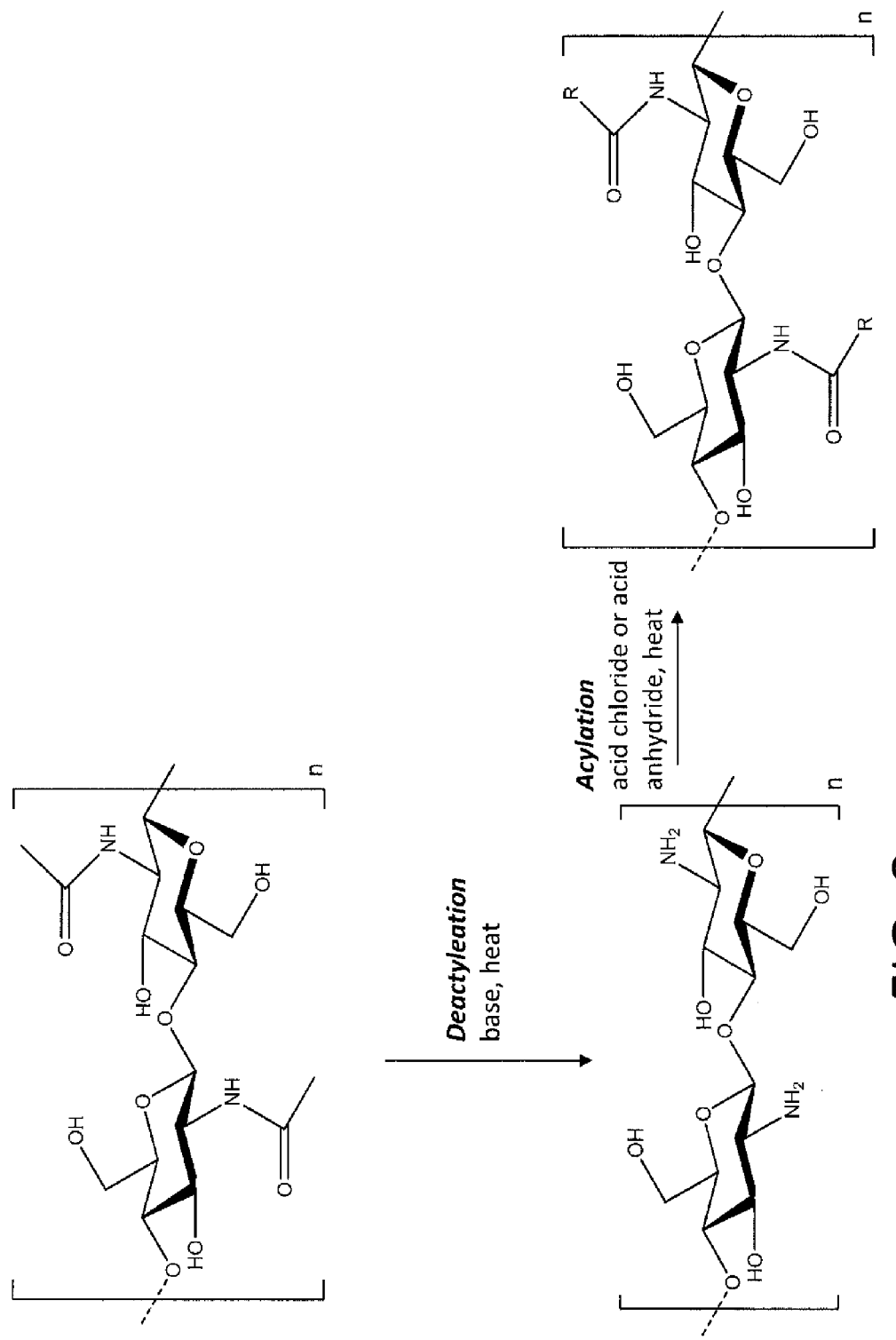
FIG. 8 shows the derivation of a chitin derivative having a side chain R on an amide functional group.

The derivation of hydrocarbon chitin nanocrystal derivatives is illustrated by FIGS. 5, 6, 7 and 8. As illustrated in the figures, often the chitin nanocrystal will be deacetylation as the first step in preparing the hydrocarbon chitin nanocrystal derivative. FIG. 5 shows a hydrocarbon chitin nanocrystal derivative prepared using carboxylic acid. Where the hydrocarbon functional group is a carboxyl functional group, suitable carboxylic acids to use in the preparation of the hydrocarbon chitin nanocrystal are monocarboxylic acids and dicarboxylic acids having 2 or more carbon atoms and, typically, from 2 to 16 carbon atoms and can include alkanes, alkenes and epoxide rings. FIG. 6 shows a hydrocarbon chitin nanocrystal derivative prepared using a ketone or aldehyde to substitute an imine functional group for the surface amide functional groups of the initial chitin nanocrystal. FIG. 7 shows the preparation of a hydrocarbon chitin nanocrystal derivative prepared using an aldehyde and reducing agent and FIG. 8 shows the production of a hydrocarbon chitin nanocrystal derivative using acylation. The use of longer chain hydrocarbons (carboxylic acids, aldehydes, ketones, etc.) in the formation of these hydrocarbon chitin nanocrystal derivatives results in longer hydrocarbon functional groups and, generally, results in a more hydrophobic or lipophillic chitin nanocrystal derivative. As will be appreciated by one skilled in the art, this allows for the adjustment of the hydrophobic nature of the hydrocarbon nanocrystal derivative to suit the intended use of the derivative.

Cross-linked chitin nanocrystal derivatives are hydrocarbon chitin nanocrystal derivatives that have been coupled or cross-linked such that the nanocrystals are coupled by the hydrocarbon functional group. For forming cross-linked hydrocarbon chitin nanocrystal derivatives where the hydrogen functional group is a carboxyl functional group, generally a dicarboxylic acid can be used with a suitable coupling agent to produce the cross-linked hydrocarbon chitin nanocrystal derivative. Suitable dicarboxylic acids can be selected from dicarboxylic acids having from 2 to 12 carbon atoms. Typically, suitable dicarboxylic acids can be selected from the group consisting of oxalic acid, malonic acid, succinic acid, glutaric acid, adipic acid, pimelic acid and mixtures thereof. Examples of coupling agents are 1-Ethyl-3-(3-dimethylaminopropyl)carbodiimide (EDC), N,N'-Dicyclohexylcarbodiimide (DCC) and N,N'-Diisopropylcarbodiimide (DIC). The production of cross-linked hydrocarbon chitin nanocrystal derivatives using carboxylic acids is illustrated in FIG. 5.

In accordance with the invention it has been found that the above described chitin nanocrystals and chitin nanocrystal derivatives have many applications in drilling and production operations such as cement compositions, well treatments and treatment fluids, gel scaffold agents and corrosion inhibitors.

Cementing Compositions

Cementing is a common well operation. For example, hydraulic cement compositions can be used in primary cementing operations during completion in which a string of pipe, such as casing or liner, is cemented in a wellbore. In operation, a wellbore fluid comprising a hydraulic cement composition is pumped as a fluid into the annular space between the exterior surfaces of a pipe string and the borehole. The cement composition is allowed time to set in the annular space. The hardened cement supports and positions the pipe string in the wellbore and bonds the exterior surfaces of the pipe string to the walls of the wellbore. Hydraulic cement compositions can also be utilized in remedial cementing operations, such as in plugging highly permeable zones or fractures in near-wellbore regions, plugging cracks or holes in pipe strings, and the like.

Hydraulic cement is a material that when mixed with water hardens or sets over time because of a chemical reaction with the water. Because this is a chemical reaction with the water, hydraulic cement is capable of setting even under water. The hydraulic cement, water, and any other components are mixed to form a hydraulic cement composition in the initial state of a slurry, which should be a fluid, for a sufficient time before setting for pumping the composition into the wellbore and for placement in a desired downhole location in the well.

In accordance with the invention, a useful cement composition comprises a hydraulic cement and at least one additive selected from the group consisting of chitin nanocrystals, chitin nanocrystal derivatives and combinations thereof. While most any hydraulic cement can be used in the invention, typically the hydraulic cement comprises at least one cement selected from the group consisting of API Class A Portland cement, API Class C Portland cement, API Class G Portland cement, API Class H Portland cement, a pozzolana cement, a gypsum cement, a high alumina content cement, a slag cement, a silica cement, and any combination thereof.

The chitin nanocrystals and chitin nanocrystal derivatives useful as additives in the cement composition are ones that are water dispersible. Preferably, the chitin nanocrystals and chitin nanocrystal derivatives will be water dispersible and not water-soluble because water soluble ones could lose their nanocrystal structure when dissolved and disassociated into individual polymer chains. Particularly suitable as additives are chitin nanocrystals, chitosan nanocrystals and oxidized chitin nanocrystals. Also, hydrocarbon chitin nanocrystal derivatives having short hydrocarbon lengths can be used. Generally, preferred are hydrocarbon chitin nanocrystal derivatives having functional groups with R having from 2 to 4 carbon atoms. Currently, it is believed that chitin nanocrystal derivatives especially suitable for use in the cement composition are those with functional groups derived from the group consisting of hydroxyls, carboxylic acids, esters, sodium carboxylate salts, potassium carboxylate salts and combinations thereof. By "derived from" it is meant that one or more functional groups of the chitin nanocrystal incorporate the hydroxyl, carboxyl or ester chain, as appropriate.

It is now recognized that the above additives may have an impact on certain physical characteristics of the resulting cements. For example, the inclusion of the additives may result in improved mechanical properties, such as compressive strength, tensile strength, Young's modulus and Poisson's ratio. Accordingly, a cement composition in accordance with the present embodiments may comprise a sufficient amount of additive to provide the desired characteristics in the resulting cement. In exemplary embodiments, the additive can be present in the cement composition in an amount of from about 1% to about 25% by weight of the hydraulic cement on a dry basis. More typically, the additive can be present in the cement composition in an amount of from about 1% to about 5% by weight of the hydraulic cement on a dry basis.

In operation, the hydraulic cement, additive and water can be mixed before introduction downhole. Afterwards, the resulting mixture is introduced downhole, typically through a pipe string that has been previously introduced into the wellbore penetrating a subterranean formation. The mixture is then introduced from the pipe string into an annular space between a pipe string and the subterranean formation and allowed to set. The resulting pipe stream can then produce hydrocarbons from subterranean formations, which it penetrates.

Well Treatments and Well Wellbore Fluids

Wellbore fluids, such as drilling fluids or drilling muds, are used for many purposes in drilling and production operations for oil and gas wells. Such fluids are used in drilling operations to cool drill bits and carry cuttings to the surface. Additionally, they are used in completion and intervention operations, such as to carry proppants to the subterranean formation during well stimulation operations such as fracturing. Typically, such wellbore fluids comprise drilling fluid or drilling mud and often comprise clays such as bentonite clay. Additionally, such drilling muds can be aqueous based or non-aqueous based. For any such wellbore fluid, additives will typically be used to enhance properties or provide additional properties to the wellbore fluid. Typical types of additives are rheology modifiers, shale stabilizers or flocculants, fluid loss additives, emulsion stabilizers, corrosion inhibitors, lubricants and weighting agents.

Rheology modifiers are typically added to the wellbore fluid to increase the viscosity. Rheology modifiers are sometimes known in the art as "thickeners" or a "suspending agent." Increasing the viscosity slows the settling or separation of the wellbore fluid into distinct phases. Additionally, increasing the viscosity helps suspend particulate material within the wellbore fluid by increasing the elastic modulus of the fluid. This latter function can help the wellbore fluid carry drill cuttings away from the drill bit and up to the surface during drilling operations. Many chitin nanocrystals and chitin nanocrystal derivatives can form hydrogen bonds with water. This, along with the extended aspect ratio of the nanofibers, allows chitin nanocrystals and chitin nanocrystal derivatives to form percolated, hydrogen-bonded gels that can be broken by agitation. Additionally, as a consequence of their aspect ratio and stiffness, they also align themselves with parallel to a shear field in a moving non-Newtonian fluid, enabling such fluids containing such nanocrystals to be shear-thinning; that is, to have a high viscosity at extremely low shear rates and a low viscosity at extremely high shear rates. Generally, chitin nanocrystals and chitosan nanocrystals can be useful in drilling muds as rheology modifiers. Additionally, hydrocarbon nanocrystal derivatives with alky and aryl functional groups can be utilized in non-aqueous or oil based drilling muds because the derivatives tend to be lipophilic. Hydrocarbon nanocrystal derivatives having ether or ester functional groups can be used in aqueous drilling muds because the derivatives tend to be hydrophilic. Exemplary hydrocarbon nanocrystal derivatives, which are useful as rheology modifiers, are ones selected from the group comprising alkyl substituted, fatty acid ester substituted, phenolic substituted and combinations thereof.

Shale stabilizers stabilize the charges on clay particles. Clay, such as bentonite, is dispersed to form a colloidal suspension in the drilling mud. The clay carries upon its surface electrical charges, which charges determine at least some of the characteristics of the drilling mud. Clay minerals within shales are well known to swell and crack when exposed to water through ion exchange and other mechanisms. It has been found that chitin nanocrystals and chitin nanocrystal derivatives can be used to control the characteristics of the drilling mud especially when chosen to have appropriate pH, as will be appreciated by those skilled in the art based upon this disclosure and prior shale stabilizing additives. Exemplary chitin nanocrystal derivatives for use as shale stabilizers are chitosan nanocrystals and oxidized chitin nanocrystal derivatives, such as those illustrated in FIGS. 3 and 4.

Fluid loss additives are introduced into drilling muds to inhibit the undesirable leakage of a fluid phase of the drilling mud into the permeable matrix of the subterranean formation into which the wellbore has been drilled. The usual approach is to introduce fluid loss additives that will substantially reduce the permeability of the matrix by blocking the permeability at or near the face of the rock matrix of the zone. For example, the fluid-loss additive may be a particulate that has a size selected to bridge and plug the pore throats of the rock matrix and thus serve as a bridging agent. The higher the concentration of the bridging agent, the faster bridging will occur. As some of the fluid phase carrying the fluid loss additive leaks into the formation, the fluid-loss additive builds up on the surface of the borehole or fracture face or penetrates only a little into the matrix of the formation. The buildup of solid particulate on the walls of a wellbore or a fracture is referred to as a filter cake. In accordance with the current invention, chitin nanocrystals and chitin nanocrystal derivatives having a width from 5 nm to 50 nm, more typically from 10 nm to 20 nm, are exceptional for plugging small pores in formations. Additionally, the relatively longer length of the nanocrystals can lie against the sides of the wellbore or fracture to produce a tightly-packed, impenetrable filter cake. Chitin nanocrystals, chitosan nanocrystals and oxidized chitin nanocrystal derivatives, such as shown in FIGS. 3 and 4, are currently preferred for use as fluid loss additives.

Emulsion stabilizers are used to keep the drilling mud emulsion from breaking down; thus, extending the emulsion's life. In some cases, drilling muds can use emulsions to increase viscosity for the effects described above for rheology modifiers. Depending on the nature of the drilling mud and emulsions used therein, the stabilizer may need to be more lipophilic or more hydrophilic. An oil-in-water emulsion is stabilized by a lipophillic surfactant and a water-in-oil emulsion is stabilized by a hydrophilic surfactant. Accordingly, hydrocarbon chitin nanocrystal derivatives with alky and aryl functional groups can be utilized in non-aqueous or oil based drilling muds because the derivatives tend to be lipophilic. Hydrocarbon chitin nanocrystal derivatives having ether or ester functional groups can be used in aqueous drilling muds because the derivatives tend to be hydrophilic. Exemplary hydrocarbon chitin nanocrystal derivatives are ones with functional groups substituted to incorporate linear or internal isomer chains of 6 to 18 carbon atoms, toluene or phenol. Exemplary hydrocarbon chitin nanocrystal derivatives having ether or ester functional groups include epoxide functionalized and fatty acid ester functionalized chains of 12 to 18 carbon atoms.

The above additives for drilling fluids used in well treatment can be present in any effective amounts. Generally, the amounts will depend on the drilling fluid used, well conditions and which of the above effects are to be achieved. Broadly, the additives can be present in the drilling fluid in an amount of from about 0.1 wt. % to about 5 wt. % bwoc of the drill fluid.

Gel Scaffold

"Gel scaffold agents" as used herein refers to gels that can be set up downhole at the subterranean formation in order to stop production or "kill" a well. Generally, subterranean well completion, workover and kill operations are conducted while the well is filled with fluid. A completion, workover, or kill fluid, such as a gel scaffold agent, is commonly placed in a wellbore prior to the operation and is often maintained in the wellbore for the duration of the operation. The gel scaffold applies a hydrostatic pressure against the formation fluid, which is greater than the pressure exerted by the formation fluid attempting to intrude into the wellbore. This overbalanced hydrostatic pressure prevents the intrusion of formation fluids into the wellbore during performance of the given wellbore operation, which is necessary from an operational standpoint to prevent interference from formation fluids and from a safety standpoint to prevent blowouts and well kicks. In uncased wells, maintaining an overbalanced hydrostatic pressure also helps prevent the wellbore wall from caving in or sloughing into the wellbore. Other functions of scaffold agents are to minimize fluid loss from the wellbore into the surrounding formation, to help support casing and tubing strings, and to provide a medium through which completion and workover operations can be performed.

In accordance with the invention, chitin nanocrystals and chitin nanocrystal derivatives can be used as gel scaffold agents to form gel downhole for the purpose of inhibiting production from the subterranean formation. As used herein, "gel scaffold" will refer to both gels resulting from ionic bonding and cross-linking. "Gel scaffold agents" will refer to compounds, and in relation to the invention, chitin nanocrystals and/or chitin nanocrystal derivatives, that can form gel scaffold. Gelling agents will refer to ionic bonding gelling agents and/or coupling agents for cross-linking.

Temporary or fragile gels can be formed from gel scaffold agents and water, and can include a gelling agent, which provides for ionic bridging between two surface functional groups of chitin nanocrystals or chitin nanocrystal derivatives. For these gel scaffolds, the gel scaffold agent is hydrophilic and can be selected from chitin nanocrystals and hydrophilic chitin nanocrystal derivatives. More specifically, the gel scaffold agent can be selected from the group consisting of chitosan nanocrystals, oxidized chitin nanocrystals and combinations thereof. Suitable gelling agents include divalent salts; that is salts formed from divalent metals such as calcium and magnesium. Exemplary divalent salts can be selected from the group consisting of $CaCl_2$, $MgCl_2$, $CaBr_2$, $MgBr_2$, $ZnBr_2$, and combinations thereof. When a gelling agent is used, the gel scaffold agent can be present in an amount of from about 1 wt. % to about 10 wt. % bwoc of the gel fluid and more typically from 2 wt. % to 5 wt. % bwoc of the gel fluid; that is in terms of the composition of the fluid to undergo gelling to form the gel scaffold. The gelling agent can be present in an amount from about 0.025 wt. % to 5 wt. % bwoc of the gel fluid and more typically from about 1 wt. % to 2 wt. % bwoc of the gel fluid.

When no gelling agent is present, the gel will form from hydrogen bonding. Accordingly, the gel scaffold agent will need to be at high concentration, generally from about 10 wt. % to about 25 wt. % bwoc of the gel fluid and more typically from about 15 wt. % to about 20 wt. % bwoc of the gel fluid.

Additionally, gel scaffolds can be formed by at least partially cross-linking suitable chitin nanocrystal derivatives. Suitable gel scaffold agents for cross-linking include hydrogen chitin nanocrystal derivatives, such as a hydrocarbon chitin nanocrystal derivative where the hydrogen functional group is a carboxyl functional group. In this embodiment the gelling agent would be a coupling agent, such as EDC, DCC or DIC. Also, chitosan nanocrystals can be cross-linked with an oxidized chitin nanocrystal derivative using a suitable coupling agent as the gelling agent.

For forming a gel scaffold downhole, the gel scaffold agent and gelling agent can be mixed at the surface and introduced into the borehole as long as the gelling or cross-linking will not be substantially complete before the agents arrive at the appropriate subterranean formation. By "not be substantially complete" it is meant that there will not be sufficient gelling or cross-linking occurring prior to the agents reaching the subterranean formation so as to inhibit the agents reaching the formation or, in the case of gels formed by a divalent salt gelling agent, so that the gel will not start dissipating or breaking up prior to reaching the formation. Often the gel scaffold agent and gelling agent will not be mixed until they are both present at the subterranean formation where the gel scaffold is needed. This can be accomplished by separate delivery systems for the gel scaffold agent and gelling agent or by encapsulating the gelling agent using delayed time or temperature encapsulating techniques as are known in the art.

Corrosion Inhibitors

Corrosion inhibitors, as the name suggests, help to inhibit corrosion on equipment used in the transportation of oil and gas or used in oil or gas wells. Corrosion is a serious issue in the oil and gas field. Corrosion can have several causes in oil and gas operations including: dissolved gases in the hydrocarbons, such as carbon dioxide or hydrogen sulfide; the often high electrolyte concentration in the water which is co-produced with the oil and/or gas; and the use of inorganic or organic acids in oil and gas operations, such as stimulation or fracturing operations.

In one embodiment of the invention, the chitin nanocrystals and chitin nanocrystal derivatives are used as corrosion inhibitors in oil and gas operations, including downhole and in pipelines for the transportation of oil and/or gas. Chitin nanocrystals and chitin nanocrystal derivatives having an amine or amide as one or more of its surface functional groups are exemplary of suitable corrosion inhibitors. These corrosion-inhibiting compositions have been found to be able to form strong films on the surface of metals where the amine or amide functional groups form non-covalent binding with the metal surfaces. Particularly suitable are chitin nanocrystal derivatives having an amine or amide as one or more of its surface functional groups and, of these, chitosan nanocrystals are particularly useful.

The corrosion-inhibiting compositions of the invention may be used at varying concentrations. What is an effective amount in a particular application will depend upon local operating conditions and type of application. For example, the temperature and other characteristics of the acid corrosion system will have a bearing upon the amount of inhibitor to be used. The higher the temperature and/or the higher the acid concentration, the greater is the amount of corrosion inhibitor required to give optimum results. The effective amount can be readily determined by one skilled in the art.

EXAMPLES

The following prophetic examples illustrate the formation of chitin nanocrystal derivatives for use in the inventive processes and the use of such chitin nanocrystals and chitin nanocrystal derivatives in the exemplary embodiments of the current invention.

Example 1

Chitin nanocrystal is mixed with a 40 to 50 wt % aqueous solution of NaOH and heated to about 90° to 95° C. under nitrogen atmosphere for about 120 to 180 minutes being stirred constantly. The mixture is then spray dried. The resultant chitosan nanocrystal is more than 60% deacetylated.

Example 2

Chitosan nanocrystal is produced in accordance with Example 1. The chitosan nanocrystal is oxidated in the presence of (2,2,6,6-Tetramethylpiperidin-1-yl)oxyl (TEMPO) by ultrasonication in water at pH 10. The resulting chitin nanocrystal derivative has carboxyl groups substituted for more than 60% of the surface hydroxyl functional groups.

Example 3

Chitosan nanocrystal is produced in accordance with Example 1. The chitosan nanocrystal is treated with oxylic acid in the presence of an EDC coupling agent by stirring with mild heating (50° to 75° C.) in aqueous solution at a pH ranging from 4 to 6. The resulting product comprises chitosan nanocrystal derivative cross-linked at the 2 position of the glucose ring in accordance with FIG. 5.

Example 4

Chitosan nanocrystal is produced in accordance with Example 1. The chitosan nanocrystal is treated with 0.5 M HCl acid at 60° to 70° C. in the presence of 3-pentanone for up to 180 minutes. The resulting hydrocarbon chitin nanocrystal derivative is in accordance with FIG. 6 and has an imine functional group at the 2 position of the glucose ring with R and R' having 2 carbon atoms.

Example 5

Chitosan nanocrystal is produced in accordance with Example 1. The chitosan nanocrystal is treated with sodium cyanoborohydride or triacetoxyborohydride as a reducing agent at 60° to 70° C. in the presence of 3-pentanone about 120 to 240 minutes. The resulting hydrocarbon chitin nanocrystal derivative is in accordance with FIG. 7 and has an R of 5 carbon atoms linked to the nitrogen at the third carbon atom.

Example 6

Chitosan nanocrystal is produced in accordance with Example 1. The chitosan nanocrystal is treated with 0.5 M of hexanoic acid anhydride at 80° to 90° C. for about 120 minutes. The resulting hydrocarbon chitin nanocrystal derivative is in accordance with FIG. 8 and has an R of 6 carbon atoms.

Example 7

A cement slurry is prepared by dry blending dry components with an API Class G Portland cement prior to adding water to form the respective slurry. The slurry includes a hydrocarbon chitin nanocrystal derivative prepared using formic acid. The hydrocarbon chitin nanocrystal is present in an amount of 15% bwoc of Class G cement. Sufficient water is added to make the density of the slurry approximately 12.0 lbs/gal. A set retarder is also added in an amount of 0.5% bwoc. The set retarder is HR-5 cement retarder, which is a sulfomethylated lignosulfonate. It should be noted that HR5 cement retarder is available from Halliburton Energy Services, Inc. and is described in U.S. Pat. No. RE 31,190.

The cement slurry is pumped as a fluid into the annular space between the exterior surfaces of a pipe string and the borehole. The cement composition is allowed time to set in the annular space. The hardened cement supports and positions the pipe string in the wellbore and bonds the exterior surfaces of the pipe string to the walls of the wellbore.

Example 8

An invert-emulsion oil-based bentonite drilling mud is prepared containing about 2 wt. % bwoc of a fatty acid ester functionalized hydrocarbon chitin nanocrystal derivative having 12 carbon atoms, with or without additional polymeric viscosifiers. The oil-water ratio ranges from 95-5 to 75-25. The resulting drilling mud is weighted to the desired density with a suitable weighting agent and then introduced downhole during drilling operations. The hydrocarbon chitin nanocrystal derivative serves as an rheology modifier, emulsion stabilizer and fluid loss additive.

Example 9

An oxidized chitin nanocrystal derivative is prepared in accordance with Example 2. The oxidized chitin nanocrystal derivative is introduced downhole in a suitable drilling fluid along with time released encapsulated $CaCl_2$. The oxidized chitin nanocrystal derivative is present in the drilling fluid in an amount of about 5 wt. % bwoc and the $CaCl_2$ is present in an amount of about 2.5 wt. % bwoc. After introduction of the drilling fluid into the borehole the encapsulated $CaCl_2$ is released and mixes with the oxidized chitin nanocrystal derivative to form the gel scaffold, which prevents the intrusion of formation fluids into the wellbore.

Example 10

Chitosan nanocrystals are introduced into an aqueous acid solvent such that a solution having chitosan nanocrystals present in an amount of 5% by weight of water in the solution is produced. The solution is introduced downhole so that the chitosan nanocrystals form films on the metal surfaces in the wellbore.

It will be seen that method of the current invention is well adapted to carry out the ends and advantages mentioned as well as those inherent therein. While the presently preferred embodiment of the invention has been shown for the purposes of this disclosure, numerous changes in the arrangement and construction of parts may be made by those skilled in the art. All such changes are encompassed within the scope and spirit of the dependent claims.

What is claimed is:

1. A method for treating a wellbore comprising:
circulating a wellbore fluid in said wellbore, wherein said wellbore fluid comprises a fluid and at least one additive selected from the group consisting of chitin nanocrystals, chitin nanocrystal derivatives and combinations thereof; wherein the chitin nanocrystals and chitin nanocrystal derivatives are substantially free of amorphous components, and wherein said chitin nanocrystals are primarily comprised of chitin molecules having an average diameter of from 5 nm to 50 nm and an average length of from 100 nm to 1000 nm and wherein said chitin nanocrystal derivatives are derived from said chitin nanocrystals.

2. The method of claim 1 wherein said chitin nanocrystals have an average diameter of from 10 nm to 20 nm.

3. The method of claim 2 wherein said chitin nanocrystals have an average length of from 200 nm to 300 nm.

4. The method of claim 1 wherein said wellbore fluid is a drilling fluid and said additive is a chitin nanocrystal derivative.

5. The method of claim 4 wherein said additive is selected from the group consisting of oxidized chitin nanocrystal derivatives and hydrocarbon chitin nanocrystal derivatives and combinations thereof.

6. The method of claim 1 wherein said fluid is a hydraulic cement.

7. The method of claim 6 wherein said circulating said wellbore fluid comprises introducing said cement composition into a space between a pipe string and a subterranean formation.

8. The method of claim 7 further comprising running said pipe string into a wellbore penetrating said subterranean formation.

9. The method of claim 6 wherein said hydraulic cement comprises at least one cement selected from the group consisting of API Class A Portland cement, API Class C Portland cement, API Class G Portland cement, API Class H Portland cement, a pozzolana cement, a gypsum cement, a high alumina content cement, a slag cement, a silica cement, and any combination thereof.

10. The method of claim 6 wherein said additive is present in an amount of from about 1% to about 25% by weight of said hydraulic cement on a dry basis.

11. The method of claim 6 wherein said additive is selected from the group comprising water dispersible chitin nanocrystal derivatives and combinations thereof.

12. The method of claim 11 wherein said chitin nanocrystal derivatives with functional groups are derived from the group consisting of hydroxyls, carboxylic acids, esters, sodium carboxylate salts, potassium carboxylate salts and combinations thereof.

13. The method of claim 1 wherein said fluid is a drilling mud and said additive is a rheology modifier and said rheology modifier is a chitin nanocrystal derivative selected from the group consisting of alkyl substituted, fatty acid ester substituted, and phenolic substituted hydrocarbon chitin nanocrystal derivatives and combinations thereof.

14. The method of claim 1 wherein said additive is a gel scaffold agent selected from the group consisting of chitin nanocrystals, chitin nanocrystal derivatives and combination thereof, and wherein said method comprises:
    circulating said fluid and a gel scaffold agent through a wellbore penetrating said subterranean formation; and
    treating said gel scaffold agent so that it forms a gel scaffold at said subterranean formation.

15. The method of claim 14 wherein said gel scaffold agent is selected from the group comprising chitosan nanocrystals, oxidized chitin nanocrystal derivatives and combinations thereof.

16. The method of claim 15 wherein said gel scaffold is produced by treating said gel scaffold agent with a divalent salt gelling agent.

17. The method of claim 14 wherein said gel scaffold agent is a hydrocarbon chitin nanocrystal derivative, and said step of treating said gel scaffold agent comprises cross-linking said gel scaffold agent by a gelling agent to produce said gel scaffold.

18. The method of claim 17 wherein said hydrocarbon nanocrystal derivative is formed from treating a chitosan nanocrystal with a carboxylic acid.

19. The method of claim 18 wherein said carboxylic acid is a dicarboxylic acid.

20. The method of claim 18 further comprising introducing said gelling agent to said gel scaffold agent at said subterranean formation.

21. The method of claim 18 further comprising:
    mixing said gel scaffold agent and said gelling agent to form an additive mixture; and
    introducing said additive mixture into said drilling fluid prior to said step of circulating said drilling fluid and inhibitor additive.

22. The method of claim 1 wherein said step of circulating a wellbore fluid further comprises contacting metal surfaces with a corrosion inhibiting amount of said additive.

23. The method of claim 22 wherein said additive is selected from the group consisting of chitin nanocrystal derivatives having at least a portion of its surface function groups that are amines functional groups.

24. The method of claim 23 wherein said additive is selected from the group consisting of chitin nanocrystal derivatives derived from a chitin nanocrystal such that 60% or more of the surface amine functional groups of said chitin nanocrystal have been substituted with amines, and combinations thereof.

* * * * *